(12) United States Patent
Fukasawa et al.

(10) Patent No.: US 12,202,479 B2
(45) Date of Patent: Jan. 21, 2025

(54) VEHICLE CONTROL DEVICE

(71) Applicant: HITACHI ASTEMO, LTD., Hitachinaka (JP)

(72) Inventors: Yoshitaka Fukasawa, Hitachinaka (JP); Katsuro Watanabe, Hitachinaka (JP); Ryosuke Shimizu, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 275 days.

(21) Appl. No.: 17/785,321

(22) PCT Filed: Dec. 15, 2020

(86) PCT No.: PCT/JP2020/046663
§ 371 (c)(1),
(2) Date: Jun. 14, 2022

(87) PCT Pub. No.: WO2021/149403
PCT Pub. Date: Jul. 29, 2021

(65) Prior Publication Data
US 2023/0011130 A1    Jan. 12, 2023

(30) Foreign Application Priority Data
Jan. 23, 2020    (JP) ................. 2020-008856

(51) Int. Cl.
*B60W 30/14*    (2006.01)
*B60W 30/16*    (2020.01)
(Continued)

(52) U.S. Cl.
CPC ........ *B60W 30/146* (2013.01); *B60W 30/162* (2013.01); *B60W 40/072* (2013.01);
(Continued)

(58) Field of Classification Search
CPC ............ B60W 30/146; B60W 30/162; B60W 40/072; B60W 40/105; B60W 50/14;
(Continued)

(56) References Cited

U.S. PATENT DOCUMENTS

2015/0183480 A1    7/2015  Ono
2016/0031444 A1    2/2016  Fairgrieve et al.
(Continued)

FOREIGN PATENT DOCUMENTS

EP    1679673 A1    7/2006
EP    3335953 A1    6/2018
(Continued)

OTHER PUBLICATIONS

WO2017030130A1 english machine translation.*
(Continued)

*Primary Examiner* — Hussein Elchanti
*Assistant Examiner* — Oliver Tan
(74) *Attorney, Agent, or Firm* — Foley & Lardner LLP

(57) ABSTRACT

Provided is a vehicle control device capable of preventing a delay in driver's bank angle operation during traveling of a straddle type vehicle on a curve and enhancing safety of the vehicle. The vehicle control device 100 is a device that is mounted on a two-wheeled motor vehicle and controls the vehicle to travel while following a preceding vehicle. The vehicle control device 100 includes a curvature acquisition unit 110 that acquires a curvature of a road in front of the vehicle and a driving force control unit 120 that limits a change amount of driving force of the vehicle per unit time based on the curvature acquired by the curvature acquisition unit 110.

8 Claims, 7 Drawing Sheets

(51) Int. Cl.
*B60W 40/072* (2012.01)
*B60W 40/105* (2012.01)
*B60W 50/14* (2020.01)
*G06V 20/56* (2022.01)

(52) U.S. Cl.
CPC .......... *B60W 40/105* (2013.01); *B60W 50/14* (2013.01); *G06V 20/588* (2022.01); *B60W 2050/143* (2013.01); *B60W 2050/146* (2013.01); *B60W 2300/36* (2013.01); *B60W 2420/403* (2013.01)

(58) Field of Classification Search
CPC ..... B60W 2050/143; B60W 2050/146; B60W 2300/36; B60W 2420/403; G06V 20/588
See application file for complete search history.

(56) References Cited

U.S. PATENT DOCUMENTS

| | | | |
|---|---|---|---|
| 2017/0162055 A1* | 6/2017 | Lehner | .................... G08G 1/056 |
| 2018/0022349 A1 | 1/2018 | Fairgrieve et al. | |
| 2020/0148209 A1* | 5/2020 | Grelaud | .......... B60W 30/18145 |
| 2020/0307553 A1 | 10/2020 | Oshida | |
| 2021/0354694 A1* | 11/2021 | Hirakuri | ............. B60W 30/045 |

FOREIGN PATENT DOCUMENTS

| | | | | |
|---|---|---|---|---|
| JP | 2000-280782 A | 10/2000 | | |
| JP | 2001-088760 A | 4/2001 | | |
| JP | 2003-327011 A | 11/2003 | | |
| JP | 2018-030587 A | 3/2018 | | |
| JP | 2018-058494 A | 4/2018 | | |
| JP | 2018-203120 A | 12/2018 | | |
| WO | WO-2005038746 A1 * | 4/2005 | ............. G01C 21/32 |
| WO | WO2014/017138 A1 | 1/2014 | | |
| WO | WO 2017/030130 | 2/2017 | | |
| WO | WO-2017030130 A1 * | 2/2017 | ............ B60T 8/1706 |
| WO | WO 2018/172870 A1 | 9/2018 | | |

OTHER PUBLICATIONS

WO-2005038746-A1 english machine translation.*
International Search Report with English Translation and Written Opinion in International Application PCT/JP2020/046663 mailed Apr. 6, 2021.

* cited by examiner

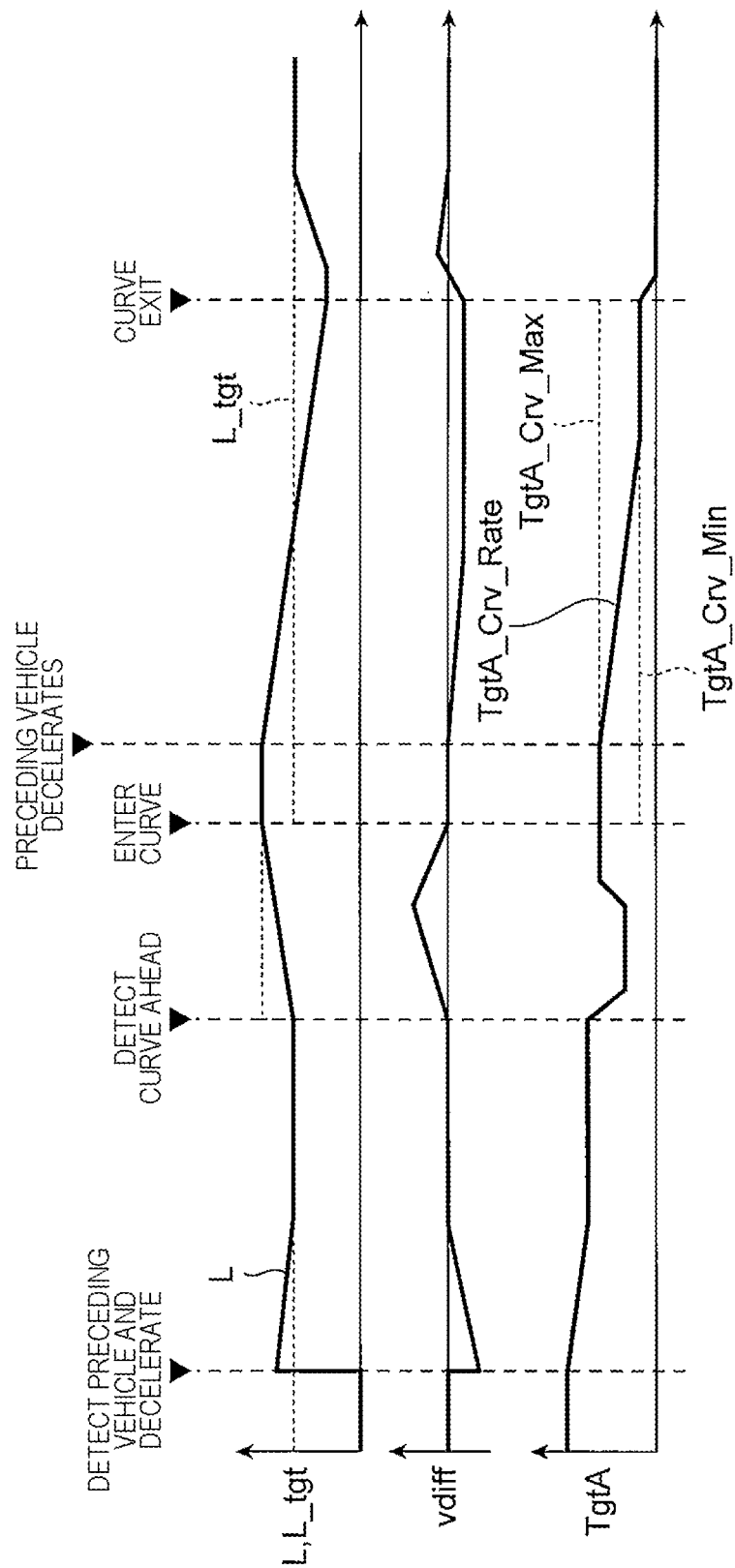

VEHICLE CONTROL DEVICE

TECHNICAL FIELD

The present invention relates to a vehicle control device that is mounted on a straddle type vehicle such as a two-wheeled motor vehicle or a three-wheeled motor vehicle and controls the vehicle to travel while following a preceding vehicle.

BACKGROUND ART

There is known a technique for controlling a four-wheeled vehicle to travel while following a preceding vehicle without a need for a driver to operate an accelerator or a brake by measuring a distance to the preceding vehicle and a relative speed to the preceding vehicle by a radar or a camera in order to reduce a burden on the driver. In addition, there is also a technique of measuring curvature of a curve and suppressing a speed and an acceleration of a vehicle travelling while following another vehicle in accordance with the measured curvature in order to suppress the lateral G during turning (see PTL 1 to PTL 4 below).

CITATION LIST

Patent Literature

PTL 1: JP 2018-30587 A
PTL 2: JP 2018-203120 A
PTL 3: JP 2003-327011 A
PTL 4: JP 2000-280782 A

SUMMARY OF INVENTION

Technical Problem

When a four-wheeled vehicle travels on a curve, turning curvature can be changed by changing a steering angle, and therefore preceding vehicle following control and a driver's turning operation can be performed independently. On the other hand, when a straddle type vehicle such as a two-wheeled motor vehicle or a three-wheeled motor vehicle travels on a curve, a driver changes a turning curvature by changing a bank angle of a vehicle body. Therefore, the bank angle is affected by braking/driving force of the vehicle, and the driver needs to adjust the bank angle while balancing the vehicle body. That is, in the case of a straddle type vehicle, preceding vehicle following control and a driver's turning operation are not independent, and the driver needs to turn the vehicle by operating the bank angle in accordance with a result of the preceding vehicle following control.

As described above, there is a difference in the turning method between a four-wheeled vehicle and a straddle type vehicle. Therefore, when the preceding vehicle following control for a four-wheeled vehicle described in the above Patent Literatures is applied to a straddle type vehicle, a drive instruction of the preceding vehicle following control may greatly vary depending on a relative speed to a preceding vehicle or a difference between a target inter-vehicle distance and an inter-vehicle distance. If a driver's bank angle operation is delayed, understeering or oversteering occurs, and there is a possibility of falling down in some cases.

The present invention has been made to solve such a technical problem, and an object of the present invention is to provide a vehicle control device capable of preventing a delay in driver's bank angle operation while a straddle type vehicle is traveling on a curve, and improving safety of the vehicle.

Solution to Problem

A vehicle control device according to the present invention that is mounted on a straddle type vehicle and controls the vehicle to travel while following a preceding vehicle includes a curvature acquisition unit that acquires a curvature of a road in front of the vehicle and a driving force control unit that limits a change amount of driving force of the vehicle per unit time based on the curvature acquired by the curvature acquisition unit.

According to the vehicle control device according to the present invention, the driving force control unit limits the change amount of the driving force of the vehicle per unit time based on the curvature acquired by the curvature acquisition unit, and therefore can limit the change in the driving force during traveling on a curve in priority to maintenance of an inter-vehicle distance from the preceding vehicle and a relative speed with respect to the preceding vehicle. This can suppress a sudden change in the driving force and therefore can prevent a delay of a driver's bank angle operation. It is therefore possible to avoid understeering, oversteering, falling, and the like of the straddle type vehicle and enhance safety of the vehicle.

Advantageous Effects of Invention

According to the present invention, it is possible to prevent a delay in driver's bank angle operation during traveling of a straddle type vehicle on a curve and enhance safety of the vehicle.

BRIEF DESCRIPTION OF DRAWINGS

FIG. 9 is a time chart of preceding vehicle following control under an environment where a curve is present.

DESCRIPTION OF EMBODIMENTS

Hereinafter, an embodiment of a vehicle control device according to the present invention will be described with reference to the drawings. In the following description, a two-wheeled motor vehicle will be described as an example of a straddle type vehicle.

Figure 1:
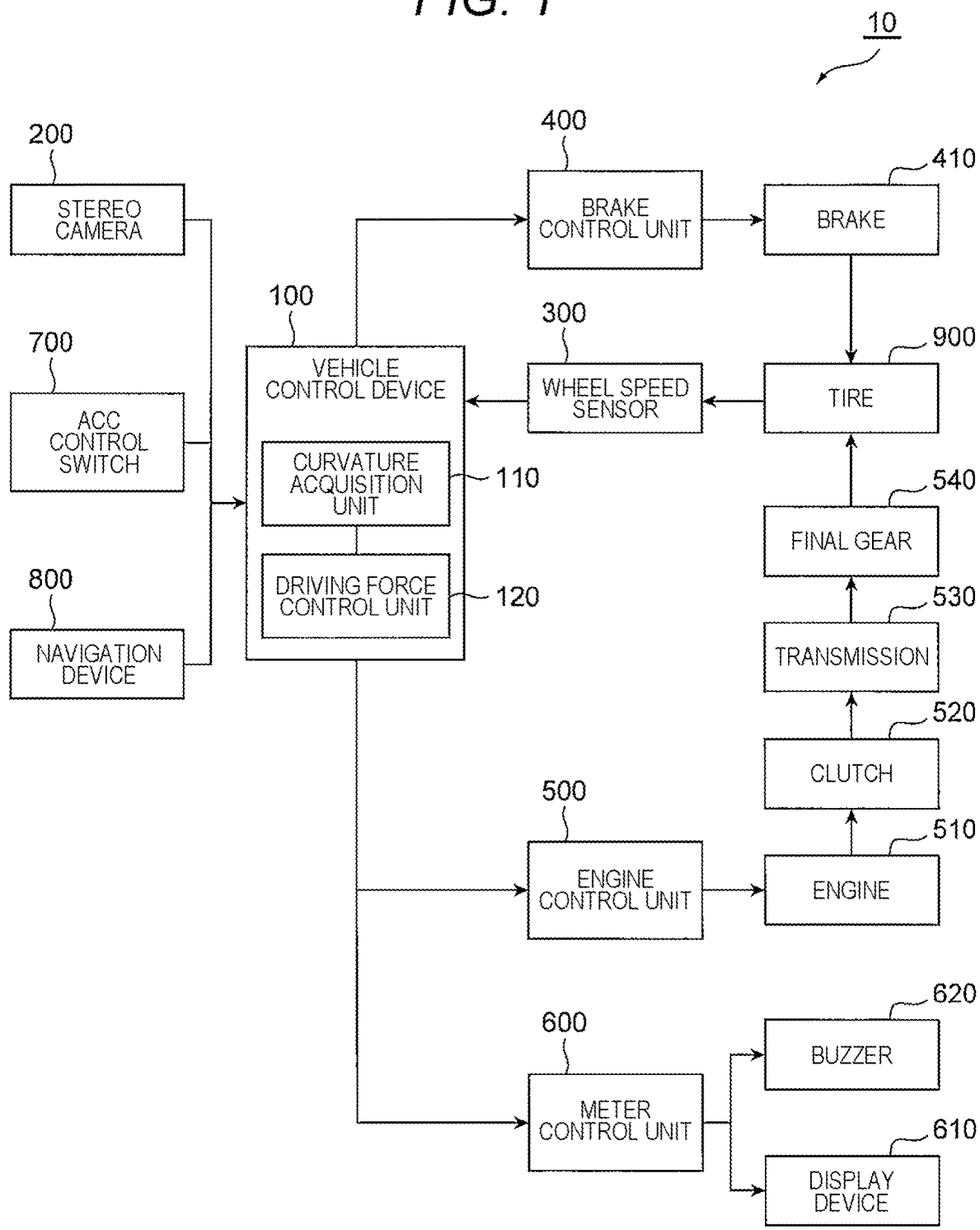
FIG. 1 is a block diagram illustrating a configuration of a vehicle including a vehicle control device according to an embodiment.

FIG. 1 is a block diagram illustrating a configuration of a vehicle including a vehicle control device according to the embodiment. A vehicle control device 100 of the present embodiment has a so-called adaptive cruise control (ACC) function, and is mounted on a vehicle 10 (hereinafter sometimes referred to as an own vehicle), which is a two-wheeled motor vehicle, and can control the vehicle 10 to follow a preceding vehicle while maintaining an appropriate inter-vehicle distance from the preceding vehicle.

As illustrated in FIG. 1, the vehicle 10 includes the vehicle control device 100, a stereo camera 200, a wheel speed sensor 300, an ACC control switch 700, and a navigation device 800 that are connected to the vehicle control device 100 and transmit information to the vehicle control device 100, and a brake control unit 400, an engine control unit 500, and a meter control unit 600 that are connected to the vehicle control device 100 and operate in accordance with a control command from the vehicle control device 100.

The stereo camera 200 includes, for example, a pair of left and right cameras using a solid-state imaging device such as a charge coupled device (CCD) and measures an inter-vehicle distance from a preceding vehicle by performing image processing on images taken by the pair of cameras. Furthermore, the stereo camera 200 can measure a bank angle of the own vehicle based on the images taken by the pair of cameras. The stereo camera 200 transmits information on the measured inter-vehicle distance and bank angle of the own vehicle to the vehicle control device 100. Furthermore, the stereo camera 200 transmits images taken by the pair of cameras to the vehicle control device 100.

The wheel speed sensor 300 is, for example, attached to a wheel, and measures a speed (hereinafter referred to as a vehicle speed) of the own vehicle based on a rotational speed of a tire 900 and transmits a measurement result to the vehicle control device 100.

The ACC control switch 700 is provided at a place (for example, a steering wheel of the vehicle 10) where the driver can easily operate while driving, and is configured to be capable of starting ACC control, canceling ACC control, changing a setting speed during ACC traveling, and the like. Specifically, the ACC control switch 700 has a switch for starting ACC control, a switch for canceling ACC control, and a switch for changing a setting speed during ACC traveling in a positive direction or a negative direction. The ACC control switch 700 transmits information on a driver's operation of the switches to the vehicle control device 100.

The ACC control switch 700 may further have a switch for enabling use of ACC as necessary, an inter-vehicle distance switch for setting an inter-vehicle distance during following traveling, and the like. Furthermore, the ACC control switch 700 may have a switch that can change the switch for starting the ACC control to a switch for changing a setting speed during the ACC traveling in a positive direction during the ACC control. This makes it possible to suppress an increase in cost caused by an increase in the number of switch types.

The navigation device 800 has map information and the like. The map information includes, for example, a curvature of a road in front of the vehicle.

The vehicle control device 100 includes, for example, a microcomputer combining a central processing unit (CPU) that executes calculation, a read only memory (ROM) serving as a secondary storage device in which a program for calculation is recorded, and a random access memory (RAM) serving as a temporary storage device in which calculation progress and temporary control variables are stored, and performs control related to ACC control.

The vehicle control device 100 includes a curvature acquisition unit 110 that acquires a curvature of a road in front of the vehicle and a driving force control unit 120 that limits a change amount per unit time of driving force of the vehicle based on the curvature of the road acquired by the curvature acquisition unit 110. The curvature acquisition unit 110 acquires the curvature of the road in front of the vehicle based on images transmitted from the stereo camera 200. For example, the curvature acquisition unit 110 specifies a boundary line of the road from the images transmitted from the stereo camera 200, and estimates and acquires the curvature of the road in front of the vehicle from a trajectory of the boundary line.

Note that the processing of estimating the curvature of the road in front of the vehicle from the taken images may be performed by the stereo camera 200. That is, the stereo camera 200 estimates the curvature of the road in front of the vehicle based on the images taken by the pair of cameras, and transmits an estimation result to the curvature acquisition unit 110. The curvature acquisition unit 110 acquires the curvature of the road in front of the vehicle by receiving the result transmitted from the stereo camera 200. Note that the curvature acquisition unit 110 may acquire the curvature of the road in front of the vehicle from the map information of the navigation device 800.

The driving force control unit 120 will be described later.

In addition, the vehicle control device 100 can grasp information such as driver's start of ACC control, canceling of ACC control, and a setting speed during ACC traveling based on switch operation information transmitted from the ACC control switch 700. Furthermore, the vehicle control device 100 calculates a control amount related to ACC based on the inter-vehicle distance from the preceding vehicle measured by the stereo camera 200, the vehicle speed measured by the wheel speed sensor 300, the setting speed transmitted from the ACC control switch 700, and the road curvature acquired by the curvature acquisition unit 110, further calculates control amounts of the brake control unit 400 and the engine control unit 500 based on the calculated control amount, and determines how to notify the driver by using the meter control unit 600.

The brake control unit 400 controls deceleration of the vehicle 10 by operating the brake 410 and thereby giving braking force to the tire 900 in accordance with an acceleration request to the brake transmitted from the vehicle control device 100. The brake control unit 400 has a function of adjusting output of the brake generated in response to the acceleration request to the brake depending on a weight of the own vehicle, a tire dynamic radius, an effective diameter of the brake, and the like.

The engine control unit 500, for example, controls an engine 510 in accordance with an acceleration request to the engine transmitted from the vehicle control device 100 (specifically, the driving force control unit 120 of the vehicle control device 100) and controls acceleration of t vehicle 10 by giving driving force to the tire 900 through a clutch 520, a transmission 530, and a final gear (for example, a sprocket) 540. The engine control unit 500 has a function of adjusting engine torque generated in response to an acceleration request to the engine in consideration of the weight of the own vehicle, the tire dynamic radius, and states of the clutch 520 and the transmission 530, and controls an engine throttle opening and an injection amount of the engine 510. Furthermore, the engine control unit 500 can also obtain a target acceleration by controlling a transmission gear ratio of the transmission 530 as necessary.

The meter control unit 600 gives a notification, a warning, or the like to the driver through vision and hearing in accordance with the notification method determined by the vehicle control device 100. For example, the meter control unit 600 notifies or warns the driver by causing a display device 610 to display information or causing a buzzer 620 to operate. The display device 610 and the buzzer 620 correspond to a "notification unit" described in the claims.

Note that the transmission and reception described above are, for example, performed by using a car area network (CAN).

Next, acceleration control performed by the vehicle control device 100 will be described with reference to FIGS. 2 to 8. The vehicle control device 100 performs ACC control by repeatedly executing control processing illustrated in the flowchart in FIG. 2 at a predetermined cycle based on an inter-vehicle distance L from a preceding vehicle transmitted from the stereo camera 200, a vehicle speed Vh transmitted from the wheel speed sensor 300, a setting speed Vt t transmitted from the ACC control switch 700, and a road curvature R acquired by the curvature acquisition unit 110.

Figure 2:
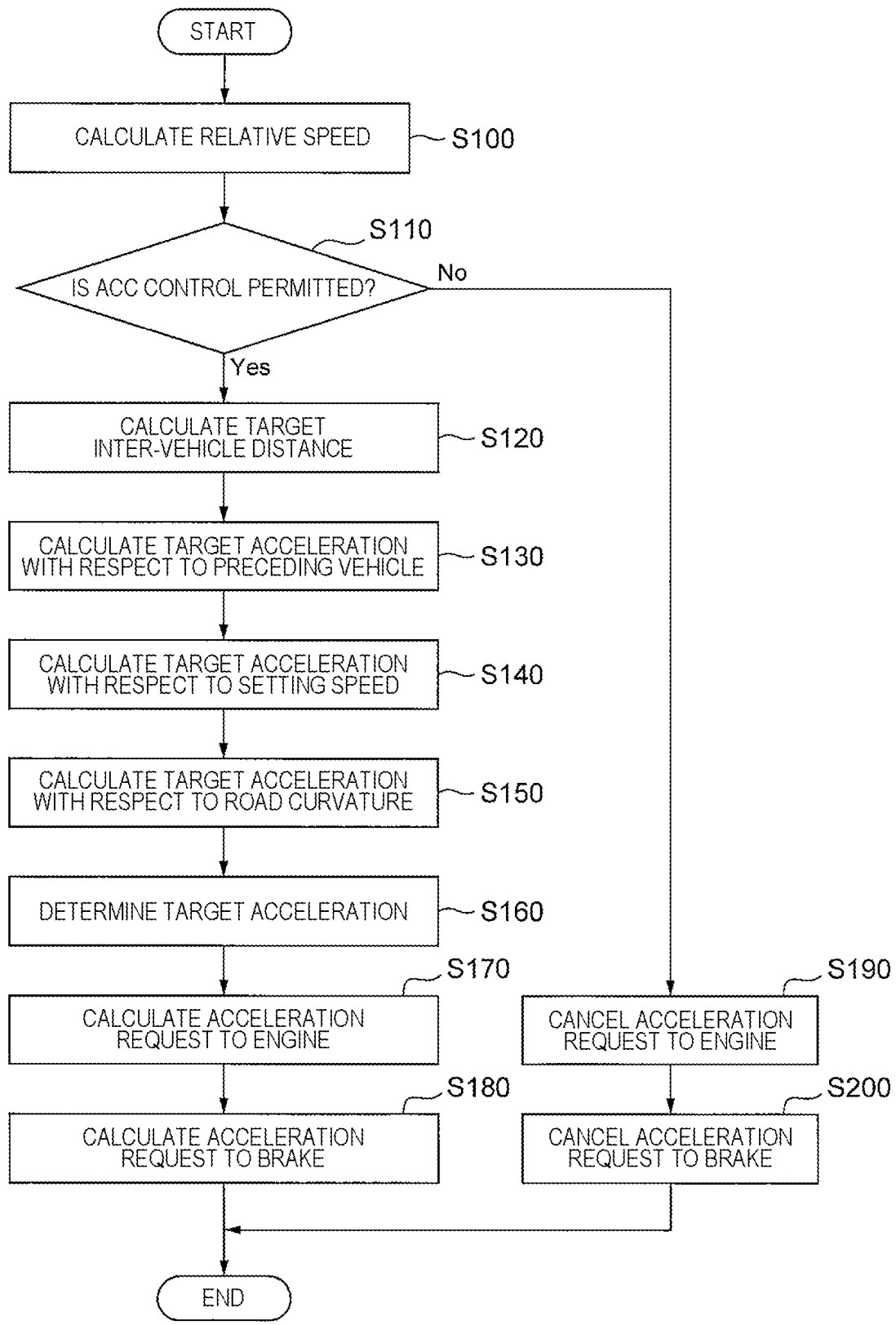
FIG. 2 is a flowchart illustrating acceleration control performed by the vehicle control device.

First, in step S100, the vehicle control device 100 calculates a relative speed Vdiff between the preceding vehicle and the own vehicle. In the present embodiment, regarding the relative speed Vdiff between the preceding vehicle and the own vehicle, a direction away from the own vehicle is set to a positive value. The relative speed Vdiff between the preceding vehicle and the own vehicle is, for example, obtained by time-differentiating the inter-vehicle distance L from the preceding vehicle. Since the control processing in FIG. 2 is executed at a predetermined cycle, the vehicle control device 100 stores the previous (that is, one cycle before) inter-vehicle distance L from the preceding vehicle in the RAM or the like of the vehicle control device 100, takes a difference between L stored one cycle before and L obtained this time, and further divides the difference by an execution cycle Tc of the acceleration control processing to calculate Vdiff.

In step S110 following step S100, the vehicle control device 100 determines whether or not to permit the ACC control. In any one of the following cases, the vehicle control device 100 does not permit the ACC control (in other words, prohibits the control). Specifically, the vehicle control device 100 does not permit the ACC control in cases such as a case where a failure has occurred, a case where an image of the stereo camera cannot be acquired due to bad weather, dirt on a lens, or the like, a case where the ACC has been made inactive by operating the ACC control switch, a case where the driver operates the brake, a case where a given period of time has elapsed after the driver releases the clutch, a case where a gear position with respect to a traveling speed is inappropriate for a given period of time or more, a case where the vehicle is traveling at an uncontrollable speed, and a case where a steering angle is equal to or greater than a prescribed value. Except for the above cases, the vehicle control device 100 permits the ACC control.

In a case where the ACC control is prohibited, the control processing proceeds to step S190. In step S190, the vehicle control device 100 cancels an acceleration request AccelReq_Eg to the engine. In step S200 following step S190, the vehicle control device 100 cancels an acceleration request AccelReq_Brk to the brake. In this way, the ACC control is not performed.

Figure 3:
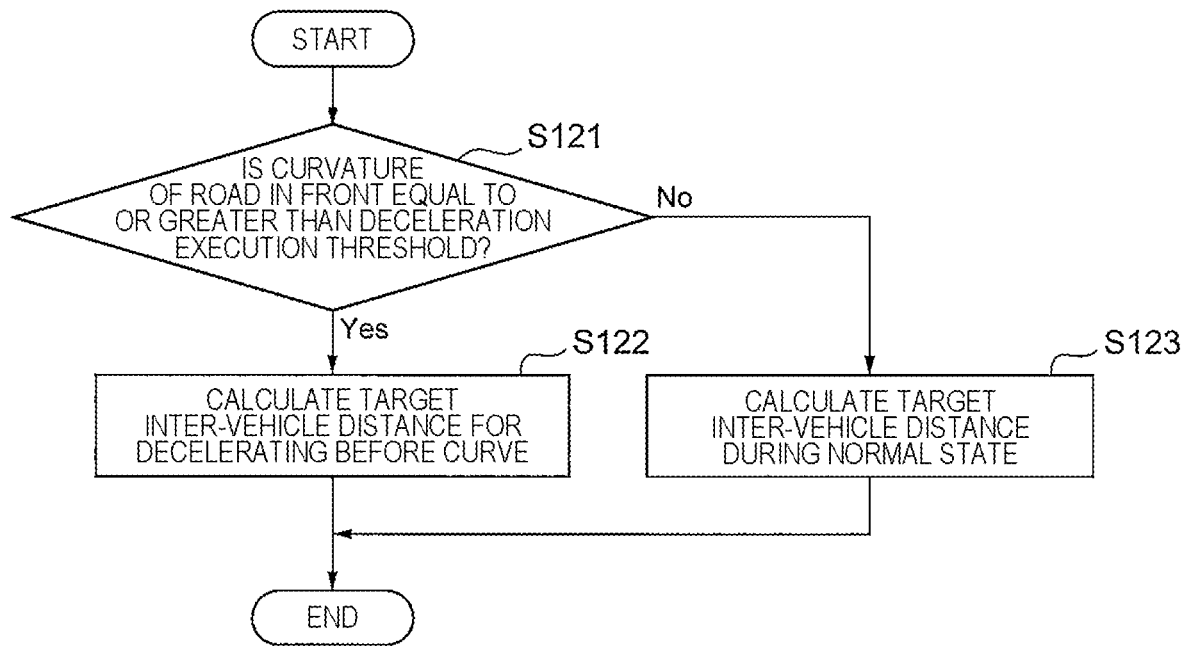
FIG. 3 is a flowchart illustrating details of step S120 (calculation of a target inter-vehicle distance) in FIG. 2.

On the other hand, in a case where the ACC control is permitted in step S110, the control processing proceeds to step S120, where a target inter-vehicle distance L_tgt is calculated. Hereinafter, calculation of the target inter-vehicle distance will be described in detail with reference to FIGS. 3 and 4. As illustrated in FIG. 3, in step S121, the vehicle control device 100 determines whether or not a curvature of a road in front is equal to or larger than a deceleration execution threshold. The deceleration execution threshold is a curvature at which the vehicle 10 needs to decelerate before entering the curve, and is, for example, set based on safety of the vehicle, vehicle characteristics, and the like and is stored in the RAM of the vehicle control device 100 in advance.

In a case where it is determined that the curvature of the road in front is equal to or larger than the deceleration execution threshold, the control processing proceeds to step S122. In step 3122, the vehicle control device 100 calculates a target inter-vehicle distance L_tgt for decelerating before the curve. The target inter-vehicle distance L_tgt is, for example, set (that is, calculated) based on the graph illustrated in FIG. 4. That is, the target inter-vehicle distance L_tgt is set to be larger as the vehicle speed Vh is larger and the curvature R of the road in front is smaller.

Figure 4:
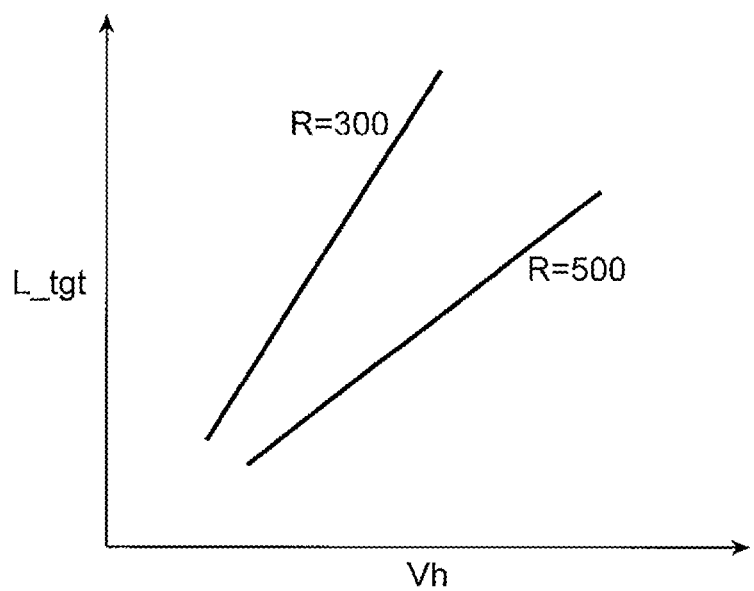
FIG. 4 is a graph for determining a target inter-vehicle distance when a curve is detected.

Note that, in the graph illustrated in FIG. 4, it is desirable that the target inter-vehicle distance L_tgt is set so that an inter-vehicle distance necessary for the own vehicle traveling on a curve to slowly decelerate can be secured even if the preceding vehicle decelerates while traveling on the curve and is adjusted in accordance with curve traveling characteristics of the vehicle 10 on which the vehicle control device 100 is mounted.

On the other hand, in a case where it is determined in step S121 that the curvature of the road in front is smaller than the deceleration execution threshold, the control processing proceeds to step S123. In step S123, the vehicle control device 100 calculates a target inter-vehicle distance L_tgt in a normal state. The target inter-vehicle distance L_tgt in the normal state is, for example, obtained by the following equation (1).

$$L\_tgt = Th \times Vp + Loffset \qquad (1)$$

In the equation (1), Th represents a time headway, Vp represents a speed of the preceding vehicle, and Loffset represents an inter-vehicle distance from the preceding vehicle at a time when the vehicle stops so as to follow the preceding vehicle. Th is set to 1 [s] to 3 [s], and Loffset is set to 3 [m] to 5 [m]. It is also possible to provide a function of changing Th and Loffset in accordance with driver's preference or a status of operation of a steering switch. This makes it possible to travel at an inter-vehicle distance matching the driver's preference. The speed Vp of the preceding vehicle is, for example, obtained by the following equation (2).

$$Vp = Vh + Vdiff \qquad (2)$$

Figure 5:
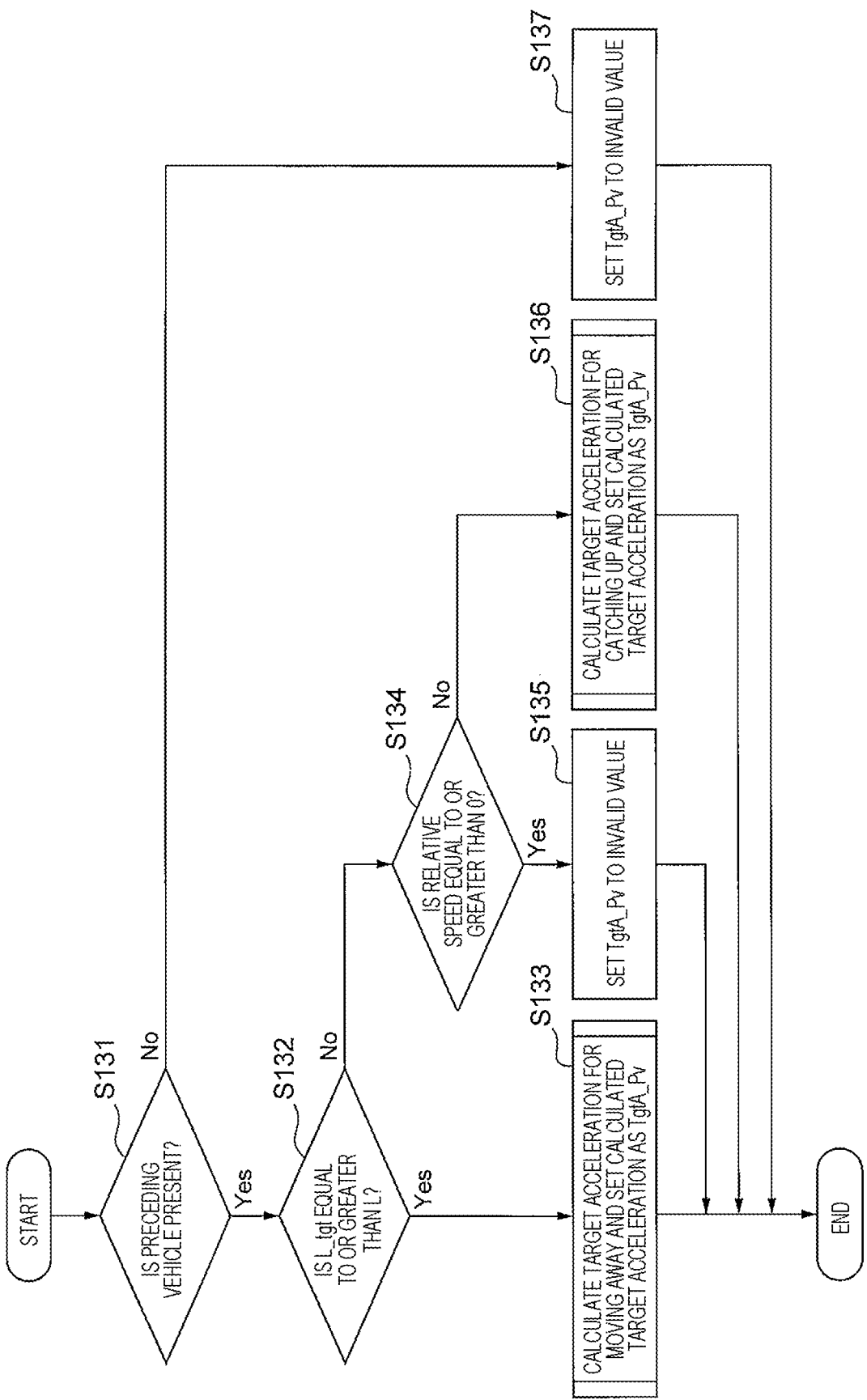
FIG. 5 is a flowchart illustrating details of step S130 (calculation of a target acceleration with respect to a preceding vehicle) in FIG. 2.
Figure 6:
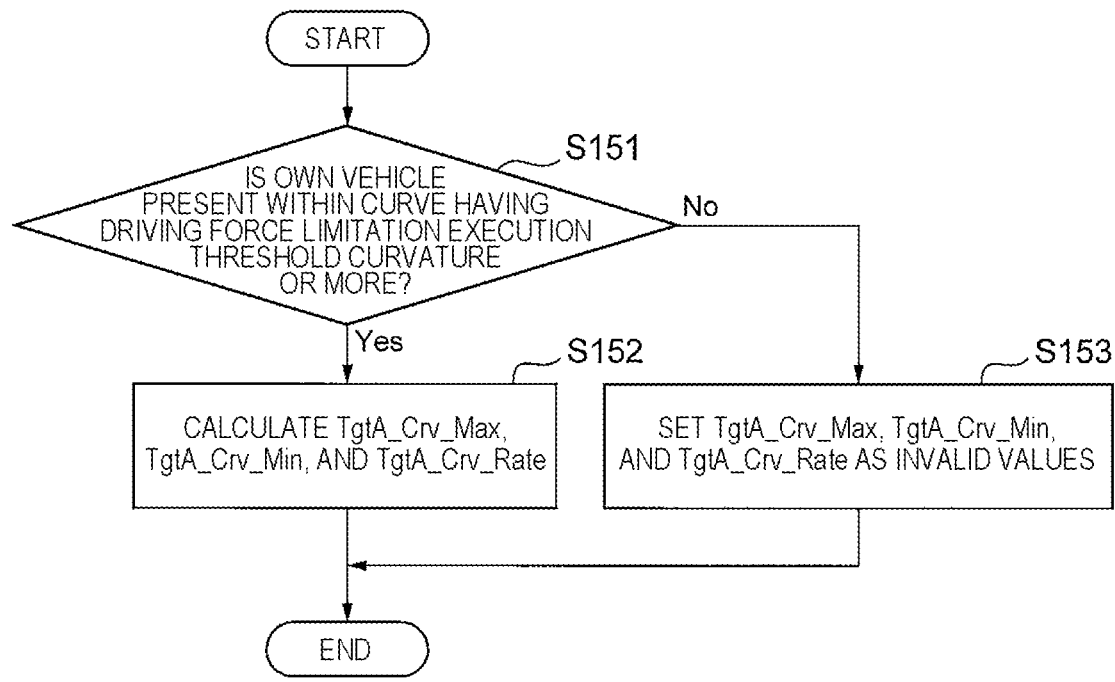
FIG. 6 is a flowchart illustrating details of step S150 (calculation of a target acceleration with respect to a road curvature) in FIG. 2.
Figure 7:
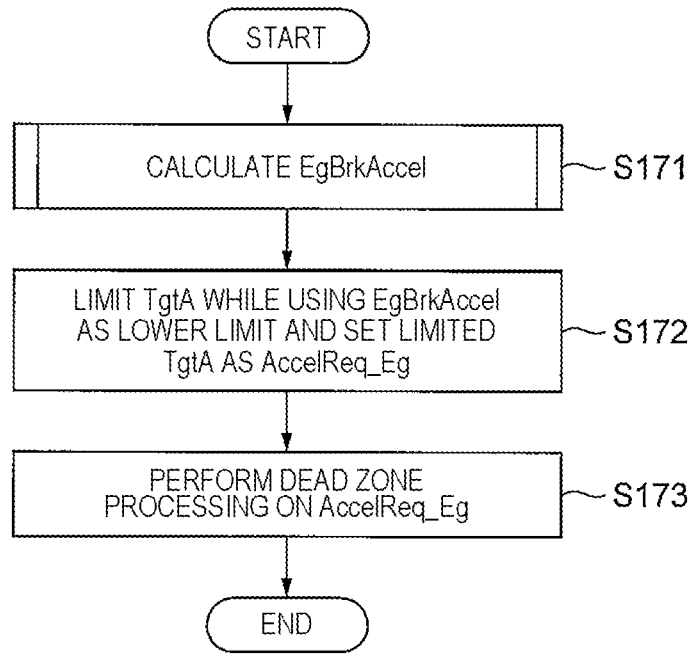
FIG. 7 is a flowchart illustrating details of step S170 (calculation of an acceleration request to an engine) in FIG. 2.
Figure 8:
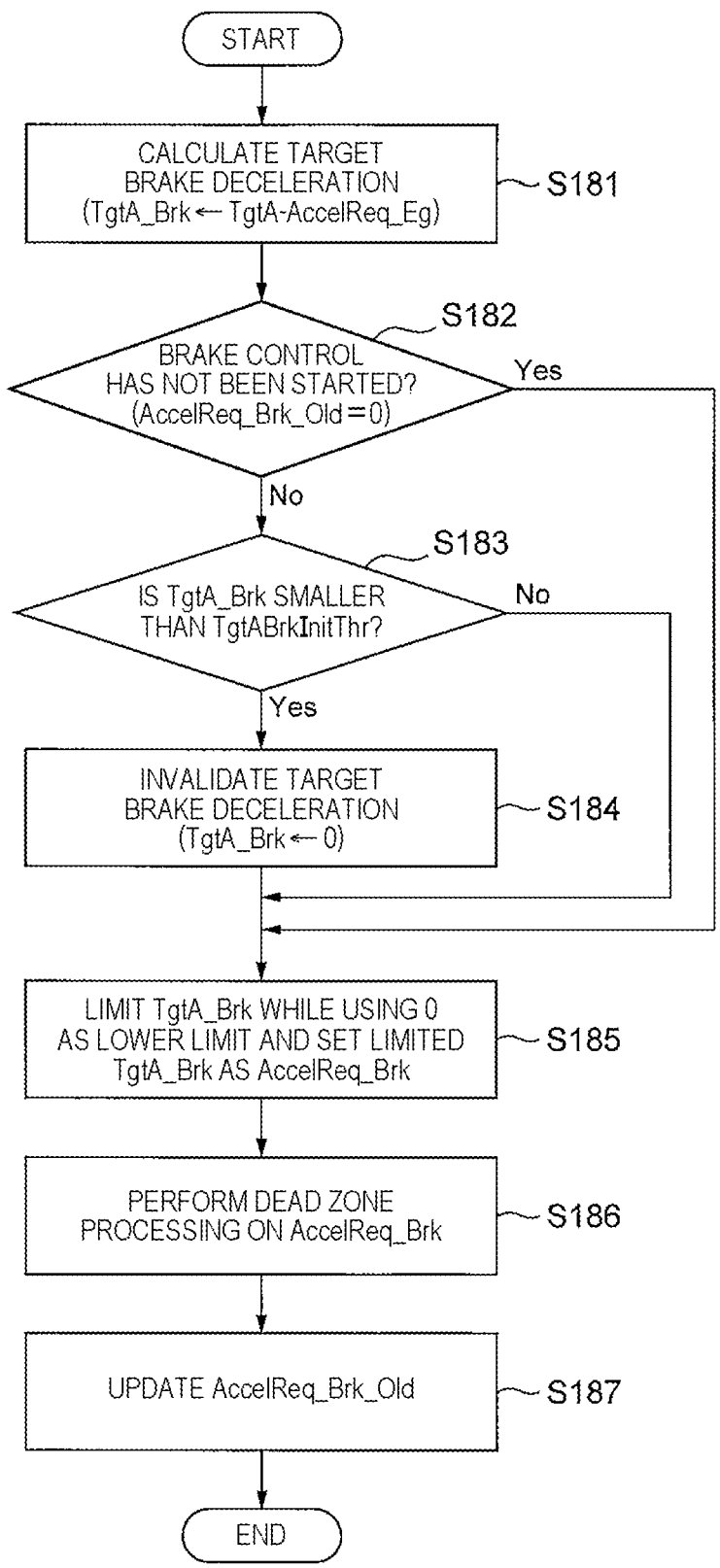
FIG. 8 is a flowchart illustrating details of step S180 (calculation of an acceleration request to a brake) in FIG. 2.

In step S130 following step S120, a target acceleration TgtA_Pv with respect to the preceding vehicle is calculated. Hereinafter, calculation of the target acceleration with respect to the preceding vehicle will be described in detail with reference to FIG. 5. As illustrated in FIG. 5, calculation of the target acceleration TgtA_Pv with respect to the preceding vehicle is switched depending on a relationship with the inter-vehicle distance and the relative speed Vdiff with respect to the preceding vehicle.

Specifically, in step S131, the vehicle control device 100 determines whether or not a preceding vehicle is present in front of the own vehicle (in other words, a preceding vehicle is detected) based on an image taken by the stereo camera 200. In a case where it is determined that no preceding vehicle is present, the vehicle control device 100 sets the target acceleration TgtA_Pv with respect to the preceding vehicle to an invalid value (step S137).

On the other hand, in a case where it is determined that a preceding vehicle is present, the control processing proceeds to step S132. In step S132, the vehicle control device 100 compares the target inter-vehicle distance L_tgt calculated in step S120 with the inter-vehicle distance L measured by the stereo camera 200, and determines whether or not the target inter-vehicle distance L_tgt is equal to or larger than the inter-vehicle distance L.

In a case where it is determined that the target inter-vehicle distance L_tgt is equal to or larger than the inter-vehicle distance L, that is, in a case where the preceding vehicle is closer than the target inter-vehicle distance L_tgt, the vehicle control device 100 calculates a target acceleration TgtA_Pv_Leave for moving away, and sets the calculated result as the target acceleration TgtA_Pv (step S133). The target acceleration TgtA_Pv_Leave for moving away is, for example, calculated based on a map value set in advance based on Vdiff and a deviation between L_tgt and L.

The map value is set so that the speed can be controlled by continuously changing the acceleration control so as to become any one of the following cases: a case where the speed is reduced while approaching the preceding vehicle, a case where the speed is reduced while moving away from the preceding vehicle, or a case where the acceleration is performed while moving away from the preceding vehicle and the relative speed with respect to the preceding vehicle is set to zero. Furthermore, depending on the relative speed with respect to the preceding vehicle, control can be performed so that only acceleration is performed while moving away from the preceding vehicle while skipping the case where the speed is reduced while approaching the preceding vehicle and the case where the speed is reduced while moving away from the preceding vehicle.

On the other hand, in a case where it is determined that the target inter-vehicle distance L_tgt is smaller than the inter-vehicle distance L, that is, in a case where the preceding vehicle is farther than the target inter-vehicle distance L_tgt, the control processing proceeds to step S134. In step S134, the vehicle control device 100 determines whether or not the relative speed Vdiff calculated in step S100 is 0 or more. In a case where it is determined that the relative speed Vdiff is 0 or more, that is, in a case where the preceding vehicle is faster than the own vehicle, the vehicle control device 100 sets the target acceleration TgtA_Pv with respect to the preceding vehicle as an invalid value (step S135).

In a case where it is determined in step S134 that the relative speed Vdiff is less than 0, that is, in a case where the preceding vehicle is slower than the own vehicle, the vehicle control device 100 calculates a target acceleration TgtA_Pv_Approach for catching up with the preceding vehicle, and sets the calculated result as the target acceleration TgtA_Pv (step S136). The target acceleration TgtA_Pv_Approach for catching up is, for example, obtained by the following equation (3).

$$\text{TgtA\_Pv\_Approach} = -Vdiff^{\wedge}2 \pm \{2 \times (L\_tgt - L)\} \quad (3)$$

Furthermore, the vehicle control device 100 calculates the target acceleration for catching up by setting TgtA_Pv to an invalid value if the inter-vehicle distance L does not become shorter than the deceleration start threshold L_Thr and setting TgtA_Pv_Approach as TgtA_Pv if the inter-vehicle distance L is longer than the deceleration start threshold L_Thr so that a situation where deceleration is started from a long distance and the preceding vehicle accelerates in the meanwhile and deceleration energy is wasted does not occur or riding comfort is not deteriorated. Normally, control with less discomfort is performed in a case where the deceleration start threshold L_Thr is set to a value around 70 m to 130 m based on a behavior during a state where the driver drives without using the ACC control. The deceleration start threshold L_Thr may be variable depending on the vehicle speed or the like.

In step S140 following step S130, the vehicle control device 100 calculates a target acceleration TgtA_Spd with respect to the setting speed. The target acceleration TgtA_Spd with respect to the setting speed is, for example, obtained by the following equation (4).

$$\text{TgtA\_Spd} = K \times (Vtgt - Vh) \quad (4)$$

In the equation (4), Vtgt is a setting speed. K is a positive constant and is, for example, set to 0.001 to 0.02. In a case where K is a variable value that is set large during acceleration and is set small during deceleration, it is easy to achieve fuel-efficient driving without using a brake for deceleration. Furthermore, in a case where K is adjusted as a variable value so that acceleration is weakened and deceleration is strengthened when the vehicle speed Vh is large, safety can be enhanced. As described above, it is desirable to adjust K as a variable value in accordance with stability of the vehicle or driver's preference.

In step S150 following step S140, the vehicle control device 100 calculates a target acceleration with respect to a road curvature. Specifically, the driving force control unit 120 of the vehicle control device 100 calculates a target acceleration upper limit TgtA_Crv_Max, a target acceleration lower limit TgtA_Crv_Min, and a target acceleration change rate TgtA_Crv_Rate. Hereinafter, this will be described in detail with reference to FIG. 6.

First, in step S151, the driving force control unit 120 determines whether or not the own vehicle is present within a curve having a curvature (that is, a driving force limitation execution threshold curvature) or more at which the driving force limitation needs to be performed. The driving force limitation execution threshold curvature is, for example, set based on safety of the vehicle, vehicle characteristics, and the like, and is stored in the RAM of the vehicle control device 100 in advance. In a case where it is determined that the own vehicle is present within the curve having the driving force limitation execution threshold curvature or more, the control processing proceeds to step S152.

In step S152, the driving force control unit 120 sets an upper limit value of the driving force by calculating the target acceleration upper limit TgtA_Crv_Max, sets a lower limit value of the driving force by calculating the target acceleration lower limit TgtA_Crv_Min, and sets a change amount of the driving force per unit time by calculating the target acceleration change rate TgtA_Crv_Rate.

The target acceleration upper limit TgtA_Crv_Max is, for example, calculated based on the road curvature so that centrifugal force generated in proportion to the vehicle speed does not exceed centripetal force generated by the vehicle body. In other words, the target acceleration upper limit TgtA_Crv_Max is calculated so that the vehicle speed does not exceed a maximum value of the vehicle speed corresponding to a maximum bank angle (camber angle) according to the road curvature. In this way, it is possible to prevent the vehicle from falling while traveling on a curve and to enhance the safety of the vehicle 10.

The target acceleration lower limit TgtA_Crv_Min is, for example, calculated as a minimum acceleration for preventing falling based on an actual bank angle. In this way, it is possible to prevent the vehicle from falling while traveling on a curve and to enhance the safety of the vehicle 10. Note that the actual bank angle is estimated based on an image acquired from the stereo camera 200. In this way, the actual bank angle can be estimated with high accuracy.

The target acceleration change rate TgtA_Crv_Rate is, for example, calculated so that an amount of change in centrifugal force generated in proportion to the vehicle speed does not exceed a centripetal force change amount determined based on a bank angle change amount that can be caused by the driver of the two-wheeled vehicle per unit time.

On the other hand, in a case where it is determined in step S151 that the own vehicle is not present within the curve having the driving force limitation execution threshold curvature or more, the control processing proceeds to step S153. In step S153, the vehicle control device 100 sets each of the target acceleration upper limit TgtA_Crv_Max, the target acceleration lower limit TgtA_Crv_Min, and the target acceleration change rate TgtA_Crv_Rate as an invalid value.

In step S160 following step S150, the vehicle control device 100 determines a target acceleration TgtA. In this step, the vehicle control device 100 first compares TgtA_Pv calculated in step S130 and TgtA_Spd calculated in step S140, and selects a smaller one, that is, a more decelerating one. Next, the vehicle control device 100 sets the target acceleration TgtA under conditions that the selected value differs from a value one control cycle before by a value falling within TgtA_Crv_Rate calculated in step S150, and is equal to or larger than TgtA_Crv_Min and is equal to or smaller than TgtA_Crv_Max.

Furthermore, it is desirable to make a change in value of TgtA smooth by always using a change amount limit or a first-order delay filter since a behavior of the vehicle becomes unstable if the value of TgtA suddenly changes due to a behavior of the preceding vehicle or a change in TgtA_Crv_Rate at an exit of the curve. Furthermore, it is desirable to suppress a change amount limit on an acceleration side more while giving priority to good ride comfort and make a change amount limit on a deceleration side asymmetric according to positive and negative directions while giving priority to safety so that acceleration becomes harder and deceleration becomes easier.

In step S170 following step S160, the vehicle control device 100 calculates an acceleration request AccelReq_Eg to the engine based on the target acceleration TgtA calculated in step S160. Hereinafter, calculation of the acceleration request AccelReq_Eg to the engine will be described in detail with reference to FIG. 7.

First, in step S171, the vehicle control device 100 calculates an acceleration EgBrkAccel generated by an engine brake. The acceleration EgBrkAccel generated by the engine brake is, for example, calculated by adding a deceleration caused by the engine and a deceleration caused by travel resistance. The deceleration caused by the engine is, for example, set according to the vehicle speed Vh in accordance with specifications of the engine and the transmission and a transmission gear ratio. The travel resistance is calculated by using a coefficient of air resistance according to a shape of the vehicle. In addition, a gradient of a road surface is calculated from a comparison between a value of a longitudinal acceleration sensor mounted on the vehicle and a differential value of the wheel speed and is added to the travel resistance as gradient resistance.

In step S172 following step S171, the vehicle control device 100 limits TgtA to an acceleration that can be operated by output control of the engine while using EgBrkAccel calculated in step S171 as a lower limit and sets the acceleration as AccelReq_Eg.

In step S173 following step S172, the vehicle control device 100 performs dead zone processing on AccelReq_Eg set in step S172 to eliminate an uncomfortable feeling given to the driver by vibration generated in the vehicle body due to a slight fluctuation in output of the engine.

Then, AcceiReq_Eg calculated in step S170 is transmitted to the engine control unit 500 by the vehicle control device 100. The engine control unit 500 controls the engine 510 based on the transmitted AccelReq_Eg, and controls an acceleration of the vehicle 10 by giving driving force to the tire 900 through the clutch 520, the transmission 530, and the final gear 540.

In step S180 following step S170, the vehicle control device 100 calculates an acceleration request AccelReq_Brk to the brake based on TgtA calculated in step S160 and AccelReq_Eg calculated in step S170. Hereinafter, calculation of the acceleration request AcceiReq_Brk to the brake will be described in detail with reference to FIG. 8.

First, in step S181, the vehicle control device 100 subtracts AccelReq_Eg from TgtA to calculate a target deceleration necessary for the brake (target brake deceleration TgtA_Brk). In step S182 following step S181, the vehicle control device 100 determines whether or not brake control has been started. Specifically, the vehicle control device 100 determines whether or not brake control has been started, for example, by determining whether or not a previous acceleration request AccelReq_Brk_Old to the brake stored in the RAM is 0.

In a case where it is determined that the brake control has not been started, the control processing proceeds to step S183.

In step S183, the vehicle control device 100 determines whether or not the target brake deceleration TgtA_Brk calculated in step S181 is smaller than a target brake deceleration effective threshold TgtABrkInitThr. In a case where it is determined that TgtA_Brk is smaller than TgtABrkInitThr, the vehicle control device 100 sets TgtA_Brk to 0 and invalidates TgtA_Brk (step S184). On the other hand, in a case where it is determined in step S182 that the brake control has been started or in a case where it is determined in step S183 that TgtA_Brk is equal to or greater than TgtABrkInitThr, the control processing proceeds to step S185 (described later).

According to steps S182 to S184, operation and release of the brake are not repeated and the operating state is continued, and therefore a phenomenon that the vehicle rattles does not occur. This improves ride comfort. TgtABrkInitThr is set as a constant value, and if TgtABrkInitThr is set too large, start of deceleration is delayed and braking tends to be sudden. On the other hand, if TgtABrkInitThr is set too small, rattling of the vehicle cannot be suppressed. Therefore, it is desirable to set TgtABrkInitThr to about 0.1 [m/s$^2$] according to brake performance and stability of the vehicle.

In step S185 following step S184, the vehicle control device 100 performs limiting processing on TgtA_Brk while using 0 as a lower limit and sets limited TgtA_Brk as AccelReq_Brk, thereby preventing an acceleration request from being erroneously issued to the brake.

In step S186 subsequent to step S185, the vehicle control device 100 performs dead zone processing on AccelReq_Brk to eliminate a sense of discomfort given to the driver by vibration generated in the vehicle body due to a minute fluctuation in output of the brake, and sets AccelReq_Brk thus obtained as a final acceleration request AccelReq_Brk to the brake.

In step S187 following step S186, the vehicle control device 100 stores the final acceleration request AccelReq_Brk to the brake in the RAM as a previous acceleration request AccelReq_Brk_Old to be used for the brake control start determination in step S182.

That is, the vehicle control device 100 updates the previous acceleration request AccelReq_Brk_Old to the brake.

Then, AccelReq_Brk calculated in step S180 is transmitted to the brake control unit 400 by the vehicle control device 100. The brake control unit 400 controls deceleration of the vehicle 10 by operating the brake 410 and thereby giving braking force to the tire 900 in accordance with transmitted AccelReq_Brk.

When step S180 is finished, the series of control processing ends.

FIG. 9 illustrates behavior of the target acceleration TgtA in a case where preceding vehicle following control is performed under an environment in which a curve is present. As illustrated in FIG. 9, the vehicle control device 100 controls the relative speed Vdiff and the inter-vehicle distance L until a curve is detected ahead. When a curve is detected in front of the vehicle, the vehicle control device 100 increases the target inter-vehicle distance L_tgt for decelerating before the curve in step S122 and increases the inter-vehicle distance L before entering the curve. By thus securing a sufficient inter-vehicle distance before entering the curve, it is possible to prevent collision with the preceding vehicle even if a change amount of the driving force per unit time is limited.

After entry into the curve, the vehicle control device 100 switches the target acceleration upper limit TgtA_Crv_Max, the target acceleration lower limit TgtA_Crv_Min, and the target acceleration change rate TgtA_Crv_Rate from invalid values, and limits TgtA so as not to make behavior of the vehicle in the curve unstable.

In this way, even if the inter-vehicle distance decreases and a relative speed changes as a result of deceleration of the preceding vehicle on the curve, the vehicle control device 100 gives priority to stabilizing the vehicle behavior over control of the inter-vehicle distance and the relative speed. That is, the driving force control unit 120 can limit a change in the driving force during travelling on the curve in priority to maintenance of the inter-vehicle distance and the relative speed with respect to the preceding vehicle. This can suppress a sudden change in driving force and therefore can prevent a delay of a driver's bank angle operation. It is therefore possible to avoid understeering, oversteering, falling, and the like of the vehicle 10 and to improve safety of the vehicle 10.

The vehicle control device 100 controls the display device 610 and the buzzer 620 of the meter control unit 600 to notify the driver that priority is given to stabilizing the vehicle behavior over control of the inter-vehicle distance and the relative speed. That is, the driving force control unit 120 notifies the driver through the display device 610 and the buzzer 620 that a change amount of the driving force per unit time is limited during the time of limitation. This allows the driver to grasp that the change amount of the driving force per unit time is being limited, thereby making it possible to reduce stress on the driver caused by the limitation.

The driving force control unit 120 preferably controls the driving force so as not to maintain the target relative speed with respect to the preceding vehicle in a case where the change amount of the driving force per unit time is limited. This can prevent the vehicle 10 from following the preceding vehicle, for example, even when the preceding vehicle suddenly accelerates, thereby giving priority to the safety of the vehicle 10.

The driving force control unit 120 preferably controls the driving force so as not to maintain the target inter-vehicle distance with respect to the preceding vehicle in a case where the change amount of the driving force per unit time is limited. This can prevent the vehicle 10 from falling, for example, even when the preceding vehicle suddenly brakes.

In a case where the limitation on the change amount of the driving force per unit time is released, for example, as a result of exit of the vehicle 10 from the curve (that is, in a case where it is determined in step S151 that the own vehicle is not present within the curve having the driving force limitation execution threshold curvature or more), the driving force control unit 120 preferably limits a transition speed at which the control that does not maintain the target relative speed with respect to the preceding vehicle transitions to the control that maintains the target relative speed. This makes it possible to prevent a sudden change in drive instruction value caused by the switching of the control, thereby enhancing the safety of the vehicle 10.

Similarly, in a case where the limitation of the change amount of the driving force per unit time is released, for example, as a result of exit of the vehicle 10 from the curve, the driving force control unit 120 preferably limits a transition speed at which the control that does not maintain the target inter-vehicle distance with respect to the preceding vehicle transitions to the control that maintains the target inter-vehicle distance. This makes it possible to prevent a sudden change in drive instruction value caused by the switching of the control, thereby enhancing the safety of the vehicle 10.

In addition to the control of the acceleration illustrated in FIG. 5, the vehicle control device 100 may perform processing of generating display information to be presented to the driver and communication processing of receiving target information over a CAN bus of the vehicle and transmitting information related to the ACC control while performing the ACC control.

In the processing of generating the display information, switch information obtained from the ACC control switch 700 and information indicating whether or not the ACC control is being executed, which is determined based on the determination conditions in step S110, are determined. In addition, whether or not a preceding vehicle for which control is to be performed is being detected by the stereo camera and control information such as the setting speed used in step S140 are set as the display information.

In the communication processing, the acceleration request AccelReq_Brk to the brake calculated as acceleration control is transmitted to the brake control unit 400, and the acceleration request AccelReq_Eg to the engine is transmitted to the engine control unit 500, and the display information generated in the processing of generating the display information is transmitted to the meter control unit 600.

Furthermore, various modifications are conceivable for the vehicle 10 and the vehicle control device 100 according to the present embodiment.

Modification 1

For example, although a two-wheeled motor vehicle is used as an example of a straddle type vehicle in the above description, the present invention is effective not only for a two-wheeled motor vehicle but also for all straddle type vehicles whose bank angle is controlled by a driver by changing a driver's center of gravity. Therefore, the present invention is also applicable to straddle type vehicles such as a three-wheeled vehicle including two front wheels and one rear wheel and a three-wheeled vehicle including one front wheel and two rear wheels.

Modification 2

Furthermore, although an inter-vehicle distance from a preceding vehicle, a road curvature, and a bank angle of the own vehicle are measured by one device, specifically, the stereo camera 200 in the above description, an inter-vehicle distance from a preceding vehicle and a bank angle of the own vehicle can also be measured by a sensor other than the stereo camera 200. For example, an inter-vehicle distance from, a preceding vehicle may be measured by a laser radar, a road curvature may be measured by a monocular camera, and a bank angle of the own vehicle may be measured by a rotation angle sensor. Furthermore, these configurations may be combined with a stereo camera or a navigation device to obtain multiple-system sensing. This can enhance reliability.

Modification 3

Furthermore, although the target acceleration change rate TgtA_Crv_Rate is "set so that an amount of change in centrifugal force generated in proportion to the vehicle speed does not exceed a centripetal force change amount determined based on a bank angle change amount that can be caused by the driver of the two-wheeled vehicle per unit time" in step S152 described above, correction can be performed within a range not exceeding the centripetal force change amount determined based on a bank angle change amount that can be caused per unit time. For example, the range can be set narrower since a driver's operation becomes easier as an amount of change in the bank angle on the curve becomes smaller.

For example, the change suppression amount can be switched in conjunction with the time headway Th switched by a driver's operation of the steering switch, as in step S123 described above. In a case where the time headway time Th used in step S123 is set to a large value, that is, in a case where the inter-vehicle distance is set to be long, there is a tendency that a moderate acceleration/deceleration change is preferred. Therefore, by correcting the value of the target acceleration change rate TgtA_Crv_Rate to be small, it is possible to provide acceleration/deceleration control that suits the preference while giving less discomfort to the driver.

Although the embodiment of the present invention has been described in detail above, the present invention is not limited to the above embodiment, and various design changes can be made without departing from the spirit of the present invention described in the claims.

REFERENCE SIGNS LIST

10 vehicle
100 vehicle control device
110 curvature acquisition unit
120 driving force control unit
200 stereo camera
300 wheel speed sensor
400 brake control unit
410 brake
500 engine control unit
510 engine
520 clutch
530 transmission
540 final gear
600 meter control unit
610 display device
620 buzzer
700 ACC control switch
800 navigation device
900 tire

The invention claimed is:

1. A vehicle control device that is mounted on a straddle type vehicle and controls the vehicle to travel while following a preceding vehicle, the vehicle control device comprising:
   a curvature acquisition system including at least one camera that acquires a curvature of a road in front of the vehicle;
   a driving force controller that:
      limits a change amount of driving force of the vehicle per unit time based on the curvature acquired by the curvature acquisition system;
      sets a lower limit value of the driving force so that a vehicle speed does not exceed a minimum value of the vehicle speed corresponding to an actual bank angle during traveling on a curve based on a target acceleration lower limit according to the curvature of the road, wherein the actual bank angle is estimated based on one or more images acquired from a stereo camera mounted on the vehicle;
      sets an upper limit value of the driving force so that the vehicle speed does not exceed a maximum value of the vehicle speed corresponding to a maximum bank angle based on a target acceleration upper limit according to the curvature of the road; and
   wherein an inter-vehicle distance and the actual bank angle is received by the vehicle control device from the stereo camera mounted on the vehicle, and wherein the inter-vehicle distance from the preceding vehicle is estimated based on one or more images acquired from the stereo camera mounted on the vehicle.

2. The vehicle control device according to claim 1, wherein
   the driving force controller controls the driving force so as not to maintain a target relative speed with respect to the preceding vehicle in a case where the change amount of the driving force per unit time is limited.

3. The vehicle control device according to claim 1, wherein
   the driving force controller system controls the driving force so as not to maintain a target inter-vehicle distance from the preceding vehicle in a case where the change amount of the driving force per unit time is limited.

4. The vehicle control device according to claim 1, wherein
   before the vehicle enters the curve, the driving force controller controls the driving force so that the inter-vehicle distance from the preceding vehicle becomes a prescribed distance or more.

5. The vehicle control device according to claim 2, wherein
   in a case where the restriction on the change amount of the driving force per unit time is released, the driving force controller restricts a transition speed at which the control that does not maintain the target relative speed transitions to the control that maintains the target relative speed.

6. The vehicle control device according to claim 3, wherein
in a case where the restriction on the change amount of the driving force per unit time is released, the driving force controller restricts a transition speed at which the control that does not maintain the target inter-vehicle distance transitions to the control that maintains the target inter-vehicle distance.

7. The vehicle control device according to claim 1, wherein
a limitation amount of the change amount of the driving force per unit time is determined based on the curvature of the road, an actual bank angle, and a vehicle speed.

8. The vehicle control device according to claim 1, wherein
the driving force controller notifies a driver by using a notification system mounted on the vehicle while the change amount of the driving force per unit time is being limited.

* * * * *